US005932644A

United States Patent [19]
Fujii

[11] Patent Number: 5,932,644
[45] Date of Patent: Aug. 3, 1999

[54] CHLORINE-CONTAINING RESIN WITH LI HYDROXIDE (MONOHYDRATE) OR LI CARBONATE

[75] Inventor: Kiyotoshi Fujii, Himeji, Japan

[73] Assignee: Showa Kako Kabushiki Kaisha, Japan

[21] Appl. No.: 08/946,893

[22] Filed: Oct. 8, 1997

Related U.S. Application Data

[63] Continuation of application No. 08/523,402, Sep. 5, 1995, abandoned.

[30] Foreign Application Priority Data

Dec. 28, 1994 [JP] Japan ................................... 6-328041
Jun. 26, 1995 [JP] Japan ................................... 7-159260

[51] Int. Cl.⁶ ............................ C08K 3/26; C08L 27/06; C08L 27/08
[52] U.S. Cl. .......................... 524/424; 524/425; 524/567; 524/568
[58] Field of Search .................... 524/424, 425, 524/567, 568

[56] References Cited

U.S. PATENT DOCUMENTS

| | | | |
|---|---|---|---|
| 3,620,995 | 11/1971 | King ........................................ | 524/436 |
| 3,622,545 | 11/1971 | Foldi et al. ............................... | 528/44 |
| 3,627,717 | 12/1971 | Kuhnen .................................... | 524/424 |
| 3,966,673 | 6/1976 | Frick et al. ............................... | 428/463 |
| 4,355,151 | 10/1982 | Shimada et al. ......................... | 528/182 |
| 4,695,383 | 9/1987 | Konagaya et al. ....................... | 528/337 |
| 4,910,244 | 3/1990 | Dierdorf et al. ......................... | 524/179 |
| 5,124,373 | 6/1992 | Baumgaertel et al. .................. | 524/425 |

FOREIGN PATENT DOCUMENTS

| | | |
|---|---|---|
| 45-30946 | 10/1970 | Japan . |
| 55-31865 | 3/1980 | Japan . |
| 58-38753 | 3/1983 | Japan . |
| 3-126747 | 5/1991 | Japan . |

OTHER PUBLICATIONS

O'Mara, "Pyrolysis–gas chromatographic analysis of poly-(vinyl chloride). II. In situ absorption of HCL during pyrolysis and combustion of PVC," Journal of Polymer Science, Part A–1, vol. 9, No. 5, pp. 1387–1400, 1971.

Derwent accession No. 82–33847E/17 for Japanese Patent No. 57–47340, Fujikura Cable Works KK, Mar. 1982.

Hiroshi Kubota, Shigeo Uchida, and Kaneru Kanaya: "A Fundamental Study of Hydrogen Chloride produced from Sodium Chloride," Study Report (1), Jun. 1980, Plastics Treatment Promoting Society.

Hiroshi Kubota, Shigeo Uchida et al: "On Volatile Chlorine Contained in Municipal Garbage "; City and Waste, vol. 112, No. 8.

Shigeo Uchida: Production and Removal of Hydrogen Chloride in the Trash Burner, Separation Technology, 22.4, 1992.

*Primary Examiner*—Robert E. Sellers
*Attorney, Agent, or Firm*—Gifford, Krass, Groh, Sprinkle, Anderson & Citkowski, P.C.

[57] ABSTRACT

A chlorine-containing resin composition and molded products thereof comprising a chlorine-containing resin and at least one of lithium compounds selected from the group consisting of lithium hydroxide, lithium hydroxide monohydrate and lithium carbonate, wherein the at least one of lithium compounds is uniformly dispersed within the chlorine-containing resin.

4 Claims, No Drawings

5,932,644

CHLORINE-CONTAINING RESIN WITH LI HYDROXIDE (MONOHYDRATE) OR LI CARBONATE

This application is a continuation of Ser. No. 08/523,402 filed Sep. 5, 1995 now abandoned.

BACKGROUND OF THE INVENTION

1. Field of the Invention

The present invention relates to a chlorine-containing resin composition which produces extremely a small amount of hydrogen chloride at fire disasters or at combustion.

2. Brief Description of the Prior Art

As usual, chlorine-containing resin compositions such as polyvinyl chloride as a typical example are universally used synthetic resins having a large amount of production, widely used for wire insulating, hose, sheet, film for agricultural use, bottles, construction materials including those for floors, walls and waved plates, or pipes, because of their low cost, excellent workability and free selectability over the range of hard to soft properties.

Polyvinyl chloride is featured in that, as containing chlorine, it exhibits high flame resistance. In other word, hydrogen chloride (hereinafter referred to HCl) produced at combustion of polyvinyl chloride suspends oxygen which is needed at combustion to exhibit flame resistance. However, HCl itself is a harmful and moreover corrosive gas, which is harmful to the human body especially at fire disasters. In addition, it is also one of the causing material of the recent acidic rain. Also, there is another problem that, when the municipal disposals are processed, the furnace wall is damaged due to corrosive property of HCl.

Although polyvinyl chloride is a largely useful material at being processed or in use, the limitation of its use has been proposed, since it produces HCl at combustion. Nevertheless, chlorine (Cl) necessary for producing polyvinyl chloride is an inevitable by-product produced at the process of electrolysis of NaCl (sodium chloride) for producing Na (sodium) as an industrially fundamental material, and one of important uses of Cl is especially suited for polyvinyl chloride. Therefore, the tendency of producing polyvinyl chloride in order to effectively consume Cl produced in manufacturing Na cannot be easily changed.

Accordingly, the important problem is how to deal with the harmful HCl generated in combustion of polyvinyl chloride. If it is enabled to decrease the quantity of produced hydrogen chloride as few as possible, it can be said the problem is solved. In other words, if no or extremely small amount of HCl is produced even when polyvinyl chloride is combusted, the balance between the quantities of Na and Cl produced as by-product in the soda industry would not be lost, and therefore polyvinyl chloride is evaluated as a useful and harmless resin. Moreover, polyvinyl chloride contains about 60% of chlorine by weight, consumes petroleum less than any other resins, and accordingly can be again recognized as a very useful resin for humans.

Recently, a flame retardant such as antimony trioxide is added in order to effect flame resistance of polyvinyl chloride, but there is a problem of relative effect with the produced HCl and detriment of HCl is still maintained, and toxicity of antimony trioxide also cannot be overlooked.

Further, for the reason of toxicity of the flame retardant, some of non-toxic hydroxides such as aluminum hydroxide or magnesium hydroxide are attempted to be used. The use of these flame retardants would cause polyvinyl chloride to be flame resistant by way of water produced through the process of dehydration. However, although polyvinyl chloride can be caused to be flame resistant up to about 300 degree C, such a property of polyvinyl chloride is not already maintained where the surface of the flammable substance is raised in the range of 700 to 800 degree C. In addition, the quantity of HCl produced at combustion even added with the flame retardant is almost the same as compared with that without the flame retardant, and still harmful nature of HCl is not reduced.

In addition, as an agent for uptaking HCl generated on combustion of the typical resin, that is polyvinyl chloride, any of calcium compounds such as calcium carbonate, especially of finely ground type thereof, calcium hydroxide, or calcium oxide is preferable, and calcium carbonate is used in practice.

Furthermore, the repeated experiments performed by the inventor over the long period of time have proved the following matters. Previously, uptaking ability of calcium compounds for HCl has been determined through the combustion test in the range from 500 to 600 degree C, which is, however, not appropriate, because the surface temperature of a substance in the actual combustion process reaches 700 to 800 degree C.

The inventor has performed a burning test of the conventional HCl uptaking compound, such as calcium compound, especially on calcium carbonate, up to the high temperature ranging from 750 to 800 degree C. The result has proved that, although such a compound has exhibited a relatively high grade of uptaking ability for HCl in the range of 500 to 600 degree C, the uptaking ability has reduced to the grade of about 50% at the higher temperature of about 800 degree C. The reason therefor is assumed that $CaCl_2$ produced by the reaction with Cl contained in polyvinyl chloride, undergoes hydrolysis by the water contained in the air flowing during combustion, and, as a result, releases chlorine which the $CaCl_2$ once captures.

The assumption above can be also supported by the following documents Nos. 1, 2 and 3 as reference:

1. Hiroshi Kubota, Shigeo Uchida, and Kaneru Kanaya: "A Fundamental Study of Hydrogen Chloride produced from Sodium Chloride", Study Report (1), June 1980, Plastics Treatment Promoting Society;
2. Hiroshi Kubota, Shigeo Uchida et al: "On Volatile Chlorine contained in Municipal Garbage"; City and Waste, Vol. 112, No.8;
3. Shigeo Uchida: Production and Removal of Hydrogen Chloride in the Trash Burner", Separation Technology, 22.4, 1992.

Also, another possibility is assumed that the evaporated $CaCl_2$ can be hydrolyzed by the water vapor, since such water vapor can be contained in the entering air and $CaCl_2$ is melted and liquidized owing to the temperature raised, over its melting point of 772 degree C. Also, in the case of any other calcium compounds, although Ca is reacted with Cl and $CaCl_2$ is formed, $CaCl_2$ is hydrolyzed to release Cl. Therefore, even though the uptaking ability is high enough in the temperature range of 500 to 600 degree C (middle temperature range), it is lowered in the high temperature range of about 800 degree C. Hence, calcium compounds are not said to exhibit high HCl uptaking ability in the high temperature range, since it is hydrolyzed to release HCl.

Tests, which have been performed on the compounds of alkali metals and alkali earth metals, have proved that each of compounds of sodium (Na), magnesium(Mg) and potassium (K) which can produce NaCl, $MgCl_2$ and KCl, respectively, is effective as a HCl uptaking agent. However, the sodium compounds, when blended with chlorine-containing resin, is not satisfactory in HCl uptaking ability, and further the produced NaCl is hydrolyzed at 800 degree C. In the case of Mg compounds, the produced $MgCl_2$ is thermally decomposed even in the relatively low temperature range below 500 degree C. In the case of potassium compounds, which exhibit deliquescence, it is not suitable as the filler, and, hydrolyzed at high temperature, also is not suitable for a HCl uptaking agent. Thus, it is proved still difficult to uptake HCl by use of each chloride of alkali metals and alkali earth metals, because each of them is hydrolyzed at high temperature.

SUMMARY OF THE INVENTION

The present invention has been made in view of the foregoing technical background. Accordingly, an object of the present invention is to provide a chlorine-containing resin composition, which produces an extremely small amount of HCl at combustion, comprising either of the following (1) to (6):

(1) a chlorine-containing resin composition including, a chlorine-containing resin, and at least one selected from the group consisting of lithium hydroxide, lithium hydroxide monohydrate and lithium carbonate;

(2) a chlorine-containing resin composition including, a chlorine-containing resin, at least one selected from the group consisting of lithium hydroxide, lithium hydroxide monohydrate and lithium carbonate, and calcium carbonate;

(3) a chlorine-containing resin composition including, a chlorine-containing resin and lithium carbonate having a particle size of not exceeding 20 micron m, preferably not exceeding 10 micron m;

(4) a chlorine-containing resin composition including, a chlorine-containing resin and lithium carbonate having a particle size of not exceeding 20 micron m, preferably not exceeding 10 micron m; admixed with at least one selected from the group consisting of metallic soaps of Zn, Cd and Pb;

(5) a chlorine-containing resin composition including, a chlorine-containing resin and lithium carbonate having a particle size of not exceeding 20 micron m, preferably not exceeding 10 micron m; admixed with at least one selected from the group consisting of metallic soaps of Zn, Cd and Pb, and at least one selected from the group consisting of an epoxy compound, a phosphorous ester, a beta-diketone, a polyol, a carboxylic acid, and a salt of lithium carboxylate; and (6) a resin molded product comprising one of chlorine-containing resin compositions according to one of the forgoing 1 to 5, as the principal starting material.

DETAILED DESCRIPTION OF THE INVENTION

As the chlorine-containing resin, polyvinyl chloride is typically mentioned, but not limited in polyvinyl chloride homopolymer. Still other examples may include block copolymers and graft copolymers formed by vinyl chloride as the main component, and further include polymer blends formed from vinyl chloride as the backbone. As comonomers, it is mentioned vinyl acetate, vinylidene chloride, acrylic acid, methacrylic acid and esters thereof, acrylonitriles, olephines including ethylene and propylene, maleic acid and anhydride thereof. These are used as single or a mixture thereof including two or more substances. Also in the case of polyvinylidene chloride, any of homopolymers, block polymers and polymer blends thereof are included.

In view of the above, the precise study on various chlorine-containing resin compositions has been performed by the inventor. The result thereof proves that one of the alkali metal compounds, i.e. lithium compound, is most preferable as HCl uptaking agent. Actually, a high uptaking ability was obtained even at high temperature, at combustion of a chlorine-containing resin composition, obtained from polyvinyl chloride, into which a lithium compound is mixed and uniformly dispersed. Lithium chloride, produced by the reaction of a lithium compound with HCl, is stable because its hydrolysis ratio does not exceed 1% even near 800 degree C, which is small enough as compared with any of compounds of alkali metals and alkali earth metals. Since the atomic weight of lithium is the smallest among metal elements, not so large amount of a lithium compound is needed to be blended as compared with other uptaking agents. Hence, even though the same mole of the compound is blended, the amount to be blended is so small that only a few influence is affected on the property to chlorine-containing resin.

Lithium chloride, produced by the reaction of a lithium compound with HCl, although its melting point of 606 degree C is lower than any of other alkali metal chlorides and alkali earth metal chlorides, has a extremely low vapor pressure, and therefore is less volatile and less affected by hydrolysis as a result of reaction with water vapor. A further advantage is that, since lithium chloride is in its liquid state at higher than 600 degree C, such liquefied lithium chloride serves to cover the chlorine-containing resin to suspend combustion of chlorine-containing resin for maintaining the same at its carbonized state. In other words, lithium chloride, which would not convert the chlorine-containing resin to the ashed state, can behave as a flame resistant agent for suspending combustion of chlorine-containing resin at high temperature.

Also, in the use of the lithium compound in combination with calcium carbonate, chlorine once captured by calcium is transferred to lithium and is captured as lithium chloride owing to the highest ionization tendency of the lithium metal ion among the metals. Thus, the decomposition of $CaCl_2$ at high temperature is suspended to increase HCl uptaking ability. Even though calcium chloride $CaCl_2$ is hydrolyzed at high temperature, if mixed with a lithium compound, chlorine is transferred to the lithium metal ion and can exist stably as lithium chloride. Therefore, by adding an excess amount of lithium chloride to the extent supposed to be hydrolyzed at high temperature, the HCl uptaking ratio can be increased.

As discussed above, as most preferable HCl uptaking agents, it can be mentioned the lithium compounds, such as lithium hydroxide (LiOH), lithium hydroxide monohydrate ($LiOH.H_2O$), and lithium carbonate ($Li_2CO_3$). Other lithium compounds, such as lithium silicates or phosphates, may be mentioned, but these unvolatile acids are not preferable as increasing decomposition of the salts at high temperature.

As to the lithium salts of other organic acids, especially of fatty acids, each having a great molecular weight, the theoretical blending amount necessary for capturing 100% of HCl produced from the chlorine-containing resin becomes extremely large. Therefore, a great influence on the property of chlorine-containing resin itself would be inevitable. Therefore, lithium hydroxide, lithium hydroxide monohydrate or lithium carbonate is preferable as the HCl uptaking agent, and a chlorine-containing resin blended with such compound at combustion produces no HCl or very few amount of HCl.

There could be some problems due to strong alkaline property of lithium hydroxide. However, this can be eliminated by surface coating with a fatty acid or another organic acid, or surface treatment with a coupling agent, or blending a suitable substance which would not affect the property of the resin, such as by microcapsulation with a polymer. In such a manner, it is possible to obtain a composition which produces no or very few HCl. As to lithium carbonate mentioned above, the reaction of lithium carbonate with HCl is carried out by the solid/gas (HCl) reaction. Therefore, the more the lithium carbonate is finely divided, the more the reaction with HCl increases. Also in this case, by surface treatment of lithium carbonate, its filling ability into chlorine containing resin is increased.

Conventionally, when a strong alkaline is blended to polyvinyl chloride, an initial coloring or degradation at the time of processing is caused. This can be prevented by a stabilizer containing tin (Sn) to obtain chlorine-containing resin mold articles free from coloring.

In summary, the chlorine-containing resin composition, which does not produce HCl at combustion, was not obtained in the past. Accordingly, the present invention is able to provide a chlorine-containing resin composition, which does not produce or produces only a few HCl and does not cause coloring or degradation.

Also, because of the small molecular weight of lithium compounds compared with other HCl uptaking agents, the blending amount thereof is lowered and there is few influence on the property of molded articles, whose processability is also excellent.

In general, the HCl uptaking ability is increased independent of the increase of the grade of fineness of the compound of HCl uptaking agent. However, in the case of lithium hydroxide (or hydrate thereof), because the melting point of both anhydride and monohydrate of lithium hydroxide is 412 degree C which is low, it is in the liquid state at combustion. Hence, the particle size thereof is not always required to be precisely considered. Rather, the particle size is only necessary to be considered as to not so distinctive when blended with the chlorine-containing resin. Moreover, when uniformly dispersed, the HCl uptaking ability is increased even with the particle size of the extent of 100 mesh. On the other hand, in the case of lithium carbonate, since it remains solid at the reaction with HCl, the uptaking ability is increased as increased fineness, which increases the surface area which serves to reaction.

Acids, which are related to each of metallic soaps of Zn, Cd and Pb, include aromatic acids, typically of benzoate family, or fatty acids, such as octoate, laurate, stearate, oleate, silinolate, hydroxystearate, and malate (including ester malate), which are in general use.

As to epoxy compounds, it is mentioned epoxidized biological oils, such as epoxidized soybean oil, epoxidized linseed oil; epoxidated fatty acid esters, such as epoxy stearic methyl, epoxy stearic ethylhexyl; bisphenol A diglycidyl ether; epoxidized polybutadiene; epoxidated alicyclic compounds, such as epoxidated tetrahydrophthalate, which are in general use.

As to phosphorous compounds, these are roughly classified in monophosphites and polyphosphites. Monophosphites include monoester, diester and triester, wherein the substituent group is alkyl group or alyl group. Polyphosphites include bisphosphites and polyphosphites. Bisphosphites include dihydric alcohols, or esters each formed from an aromatic compound having two hydroxyl groups and a tetrahydric alcohol (e.g. pentaerythritol).

As to beta-diketones, which are specifically effective for improving uptaking ability only when a zinc (Zn) metallic soap is especially blended, examples are stearoyl benzoyl methane, dibenzoyl methane, and so on.

Examples of polyols include polyols as typically represented by pentaerythritol; further include glycerin, sorbitol, mannitol, dipentaerythritol, trimethylpropane, polyethylene glycol, polyvinyl alcohol, and compounds thereof partially esterified by reaction of the part of their hydroxyl groups.

As to carboxylic acids, classified to chain carboxylic acids (i.e. fatty acids) and cyclic carboxylic acids (alicyclic and aromatic). Fatty acids include saturated and unsaturated fatty acids, straight chain and branched chain fatty acids, hydroxyl acids, and alkoxy acids. There are respectively a lithium salt of the corresponding acids thereof. As to carboxylic acids, similarly to the acids used for metallic soaps, benzoate acids among aromatic acids are used. On the other hand, among fatty acids, generally used are octoate, laurate, stearate, oleate, silinorate, hydroxystearate, and maleate (including ester maleate).

The inventor's experiment reveals, the more finely divided and the more the amount is increased beyond the theoretical amount, the more the surface area of lithium carbonate which reacts with HCl increases and accordingly the HCl uptaking rate increases. However, even though finely divided lithium carbonate is uniformly dispersed in chlorine-containing resin, still there is yet a part of HCl which remains unreacted with lithium carbonate to be freely produced. In this case, by addition of a metal compound, whose reaction rate with HCl is higher than lithium, the process can be improved such that, once chlorine is captured by such a compound, it is transferred to lithium which is stable at high temperature and is kept in the form of lithium chloride (LiCl). As the metal compound, a metallic soap conventionally known as thermal stabilizer for the chlorine-containing resin, especially each metallic soap of zinc (Zn), cadmium (Cd) and lead (Pb), is preferable, and these compounds, in addition to their thermal stabilizing effect, have been proved that they serve to increase HCl uptaking ability of lithium carbonate.

Addition of these compounds effects increase of the overall uptaking ability, which exceeds the amount captured in the form of metal chloride produced by the reaction between the metal component (Zn, Cd, Pb) and HCl. This advantage can be attributed to the process, that is, when the metal compound is heated up to 300 degree C, it captures HCl as e.g. zinc chloride, and subsequently the same compound is subjected to ligand reaction with lithium carbonate to steadily capture HCl as lithium chloride. Moreover, it has been experimentally proved that, by the above-mentioned blended system and further introducing another one or more compounds, such as selected from the group consisting of epoxy compound, phosphorous ester, beta-diketone, polyol, carboxylic acid, and lithium salt of such carboxylic acid, the HCl uptaking ability is further improved. More precisely, in such improvement, the improved combination of compounds exhibits the effect which exceeds their conventional effect which was merely limited in stabilizing effect.

The organic compounds discussed above themselves are provided with HCl uptaking ability, do not react with lithium carbonate by heating, tentatively capture HCl generated from the chlorine-containing resin, thereafter the organic chloride compound is thermally decomposed to enhance reaction of produced HCl with lithium carbonate. And, since these organic compounds capture the metal chlorides produced from the reaction between Zn, Cd and Pb and HCl as chelaters, coloring at processing time can be prevented. Especially, in the combination with lithium carbonate, Zn metallic soap and epoxy compound together with phosphorous ester provide a universally excellent uptaking ability. Addition of carboxylic acid and lithium carboxylate is supposed to provide the effect of promoting such ligand reaction.

There is another preferred combination comprising lithium carbonate, Zn metallic soap and beta-diketone. Also, a modified combination, in which beta-ketone above is substituted by polyol, is preferable in view of HCl uptaking ability, but suffers from its solubility with chlorine-containing resin or plasticizer, such as DOP, since polyol has hydroxyl groups. Therefore, skill is necessary for achieving uniform mixing. When one of these is solely used with lithium carbonate for the HCl uptaking agent, rather the HCl uptaking rate is lowered. This is supposed that these organic compounds have no ability of uptaking HCl, but have only chelate effect. These compounds when combined with metallic soaps are just effective for increasing the ability of lithium carbonate.

The preferred combinations are listed as follows:
(1) lithium carbonate—metallic soap of Zn, Cd or Pb—epoxy compound;
(2) lithium carbonate—metallic soap of Zn, Cd or Pb—polyol-phosphorous ester;
(3) lithium carbonate—metallic soap of Zn—beta-diketone;
(4) lithium carbonate—metallic soap of Zn—fatty acid lithium;
(5) lithium carbonate—metallic soap of Zn, Cd or Pb—polyol
(6) lithium carbonate—metallic soap of Zn;
(7) In the case of lithium carbonate alone, the average particle size of 2 micron m or less is necessary.

In view of safety and hygienics, the recent tendency is to reduce the use of metallic soaps of Cd and Pb. Therefore, a non-toxic Zn metallic soap will be principally used together with the organic compounds. In the case of calcium compounds, it is possible to improve the HCl uptaking ability by addition of calcium carbonate (of finely divided type) which is mixed to the above-mentioned composition of optimal blending. In this case, however, there is no synergetic effect, but merely an additive effect for improvement. Further, since calcium carbonate is hydrolyzed at high temperature to release HCl, it is presumably difficult to increase its HCl uptaking ability to 100%.

Conventionally, the polyvinyl chloride resin is in general molded by the methods of calender, extrusion, injection, casting and dipping. Also, the chlorine-containing resin composition of the invention can be molded in the similar manner. For molded products, those of both hard and soft are capable of being molded. For example, extruded products of polyvinyl chloride include pipe, hose, tube, hard plate, hard wave plate, wire coating, film, or other articles. Calender molding produces the molds of soft sheet, film, artificial leather; and slush molding produces those of material of wall and floor, gloves and toys. For film, welding bonding is possible. These mold products produce harmful HCl less than the conventional polyvinyl chloride molds at combustion disposal, and less effect on the environment.

To the chlorine-containing resin composition of the invention, a stabilizer as generally used or other additives may be mixed to the extent not to inhibit the HCl uptaking ability. These include: plasticizer, organic phosphoric ester, organic tin ester, organic or inorganic titan compound, metallic soap (of other than Zn, Cd, Pb), ultraviolet absorber, anti-acid agent, viscosity adjuster, pigment, dye, processing aid, anti-shock reinforcing agent, parting agent, anti-fungal germicide, fluorescent whiteness intensifier, anti-cloudness agent, non-drop agent, drop agent, anti-static agent, polyhydric or higher alcohol, organic solvent, filler, flame retardant, aromatic agent, bridging agent, and anti-plate out agent.

Other than the above, effective as flame resistant are: dehydrate type flame retardants, such as aluminum hydroxide and magnesium hydroxide other than antimony trioxide; those of phosphor compounds (such as phosphates, phosphites, or red phosphor-related substances); and compounds called "flame-resistant catalysts" which serve to promote the reaction process through which polymers such as polyvinyl chloride are charred at combustion, e.g. metal compounds such as nickel oxide or ferrocene. These may be also used as the combination with lithium carbonate. Further, various forms of surface treatment may be performed for the surface improvement of lithium carbonate itself, such as the treatment by fatty acid or resinous acid; or by a coupling agent of titanate, silan, aluminum or amino acid.

A metallic soap of Zn, Cd or Pb and a compound defined by the patent claim such as epoxy compound or phosphorous ester, which are combined together, may be called a composite stabilizer, and such a stabilizer, further mixed with lithium carbonate, may be added to polyvinyl chloride.

Hereinafter described are a first and a second compositions according to the invention.

Table 1 shows the first embodiment of chlorine-containing resin composition, which is fabricated by the process described below, formed in a sheet, and the amount of produced HCl was measured and the HCl uptaking rate was determined. The result is shown in Table 2.

(1) Preparation of chlorine-containing resin composition

To 100 weight parts of polyvinyl chloride (Geon-121 <P=1600> resin, made by Nihon Zeon), there were added with, 60 weight parts of DOP (di-2 ethylhexyl phthalate) as plasticizer; 3.5 weight parts of polyglycerin fatty acid ester as viscosity adjuster; 20 weight parts of isoparaffin family hydrocarbon as diluent; 2.0 weight parts of stabilizer (of Sn compound) as necessary; and a predetermined amount of lithium carbonate as the reaction filler for HCl, to form a chlorine-containing resin composition paste, which was mixed using a mixing stirrer, passed through a three roller, and finally debubbled to obtain a paste.

(2) The reaction filler for HCl used herein comprising:

(i) lithium hydroxide (anhydride or monohydrate); first class reagent;

(ii) lithium carbonate: finely divided type, made by Honjo Chemical; and (iii) colloidal calcium carbonate: of super fine particle size type, with average particle size of 9.6 micron m, made by Shiraishi Calcium Kabushiki Kaisha.

(3) Preparation of chlorine-containing resin composition sheet

The chlorine-containing resin composition paste prepared above was dropped and extended by a coater over the surface of a glass plate, then placed in an oven at 170 degree C for ten minutes, and kept quiet at room temperature to be cooled, and thereafter removed from the plate to obtain a composition sheet.

(4) Measurement of HCl gas produced from the resin composition sheet by combustion The test was performed according to the method of JIS K1217, such that a tubular electric furnace was connected to a gas absorbing bottle and a pump, a fixed amount of air was supplied from the pump to the furnace, in which a combustion boat having the sheet to be heated and flamed, the produced HCl gas was allowed to react with and absorbed by sodium hydroxide solution within an absorption bottle, and the chlorine density in the water was determined by means of ion chromatography.

(5) Measuring condition (i) Combustion temperature: 750 degree C, (ii) Flaming time: 15 minutes, (iii) Sample amount: approx. 0.2 g, (iv) Absorbing liquid: 0.5% sodium hydroxide, (v) Carrier gas: air, and (vi) Combustion boat: made of platinum.

(6) Computation of uptaking rate for HCl produced from chlorine-containing resin composition sheet by combustion The measured value of HCl, produced from the specimen of the resin composition, was converted to a value per 1 gram (i.e. the produced HCl amount per 1 gram of specimen), which was set as the resultant measured value. From the measured value and the theoretical amount of produced HCl (i.e. the amount when no HCl produced by combustion was uptaken), the uptaking rate was determined by using the following formula:

$$\text{HCl uptaking rate (\%)} = \frac{\text{Theoretical value of HCl to be produced} - \text{Measured value}}{\text{Theoretical value of HCl to be produced}} \times 100$$

For comparison, measurement of HCl producing value and computation of HCl uptaking rate was performed for the chlorine-containing resin composition of Comparative example in Table 1 by the same method as for the Embodiments, and the result thereof is shown in Table 2 (See Tables 1 and 2).

As can be seen in Table 2, both the compositions: (1) one composed of the combination of: polyvinyl chloride and a lithium compound (LiOH, LiOH.H$_2$O, or Li$_2$CO$_3$), and (2) another composed of the combination of: polyvinyl chloride and a lithium compound (LiOH, LiOH.H$_2$O, or Li$_2$CO$_3$) and further including the fine particle sized calcium carbonate, are compared with the Comparative example: and it is shown that each of these exhibits excellent HCl uptaking ability at medium and high temperatures (ranging from 500 to 800 degree C), which ability also remains as high as 90% or more.

Calcium carbonate with fine particle size exhibits a high HCl uptaking rate in the range of 500 to 800 degree C, which is, however, still lowered to the order of 50% near 800 degree C, namely it is difficult to exhibit a high uptaking rate.

In the case of Embodiment 3, it exhibits a lower as 50% but stable uptaking rate in the medium to high temperature range. Also, the lithium carbonate used in this Embodiment has an average particle size of as large as 10 micron m. Therefore, it is supposed, by providing fine particle size to increase the surface area as mentioned above, its uptaking ability would be further increased.

In contrast, the heavy type calcium carbonate, in spite of its more fine particle size, its HCl uptaking rate is not increased. Furthermore, at high temperature as 800 degree C, CaCl$_2$ is hydrolyzed to release the once captured HCl to lower the uptaking rate. Thus, it is evident the HCl uptaking ability of calcium compounds, such as calcium carbonate, decreases at high temperature.

In contrast, the sheet molded from the chlorine-containing resin composition, when blended with a Li compound, or with the combination of a Li compound and fine particle calcium carbonate, captures HCl steadily even at high temperature and produces very few HCl.

Hereinafter, the Embodiments of the third to fifth compositions are discussed.

Each of chlorine-containing resin compositions in Tables 3 and 4 prepared through the following process was formed in a sheet, and the amount of produced HCl was measured and the HCl uptaking rate was evaluated. Table 5 shows the result thereof.

(1) Preparation of chlorine-containing resin composition

To 100 weight parts of polyvinyl chloride (Geon-121 <P=1600> resin, made by Nihon Zeon), there were added with, 60 weight parts of DOP (di-2 ethylhexyl phthalate) as plasticizer; 3.5 weight parts of polyglycerin fatty acid ester as viscosity adjuster; 20 weight parts of isoparaffin family hydrocarbon as diluent; 2.0 weight parts of stabilizer (of Sn compound) as necessary; and a predetermined amount of lithium carbonate as the reaction filler for HCl, to form a chlorine-containing resin composition paste, which was mixed using a mixing stirrer, passed through a three roller, and finally debubbled to obtain a paste.

(2) Lithium carbonate used in experiments of Embodiments

Lithium carbonate, of fine particle type having average particle size: 9.6 micron m. made by Honjo Chemical, was ground by a ball mill to obtain the particle size shown in Tables 3 to 5.

(3) Preparation of chlorine-containing resin composition sheet

The chlorine-containing resin composition paste prepared above was dropped and extended by a coater over the surface of a glass plate, then placed in an oven at 170 degree C for ten minutes, and kept quiet at room temperature to be cooled, and thereafter removed from the plate to obtain a composition sheet.

(4) Measurement of HCl gas produced from the resin composition sheet by combustion The test was performed according to the method of JIS K1217, such that a tubular electric furnace was connected to a gas absorbing bottle and a pump, a fixed amount of air was supplied from the pump to the furnace, in which a combustion boat having the sheet to be heated and flamed, the produced HCl gas was allowed to react with and absorbed by sodium hydroxide solution within an absorption bottle, and the chlorine density in the water was determined by means of ion chromatography.

(5) Measuring condition (i) Combustion temperature: 750 degree C, (ii) Flaming time: 15 minutes, (iii) Sample amount: approx. 0.2 g, (iv) Absorbing liquid: 0.5% sodium hydroxide, (v) Carrier gas: air, and (vi) Combustion boat: made of platinum.

(6) Determination of uptaking rate for HCl produced from chlorine-containing resin composition sheet at combustion was performed by the same method as Embodiments 1 to 4

For comparison, the theoretical value of HCl produced from 1 g of polyvinyl chloride at combustion was estimated, which was 584 mg/g.

The result proved that lithium carbonate having each particle size of Embodiments 1, 2, 3 and 4 exhibits the HCl uptaking rate higher as its particle size decreases, and, in order to attain an uptaking rate of 90% or more with lithium carbonate alone, an average particle size of 2 micron m or less is required.

For 100 weight parts of polyvinyl chloride (phr), the theoretically estimated amount of lithium carbonate necessary to capture the total quantity of HCl is 60 phr. However, with a large particle size, still remains the unreacted lithium carbonate inside each particle, since only the surface of lithium carbonate particles undergo reaction. For improvement therefor, one method is to increase the amount of lithium carbonate, which allows the same effect as increasing the surface area, and the resultant improved uptaking rate is proved by Embodiments 3, 5 and 6. Particularly, with the average particle size of 3.2 micron m, 120 phr of lithium carbonate provides the same effect as 60 phr thereof with the particle size of 1.4 micron m.

The effect of lithium carbonate on the uptaking ability is, as can be seen by comparison between Embodiments 3 and 7, and also between Embodiments 8 and 9, increased by the addition of Zn soap. Even though Zn soap is reacted to produce $ZnCl_2$, since the combustion temperature (750 degree C) is higher than the boiling point of 723 degree C, the $ZnCl_2$ is evaporated or hydrolyzed to produce HCl, which is actually measured. However, it is clear enough the addition of a metallic soap provides a synergetic effect on the reaction between lithium carbonate and HCl.

Then, as found from the resultant effect of the combination of lithium carbonate, Zn soap, an epoxy compound and a phosphorous ester as used in Embodiments 8, 10, 11, 12, 13 and 14, compared with the addition of a metallic soap as sole, by the combination of the metallic soap together with an epoxy compound and a phosphorous ester, the effect is further increased. Although a combination of Zn metallic soap either with an epoxy compound or with a phosphorous ester exhibits a higher effect, the combination of the Zn metallic soap with both an epoxy compound and a phosphorous ester exhibits a further improved uptaking effect. In the case the Zn soap is omitted, as shown by the comparison between Embodiments 15 and 4, the combination of only an epoxy compound and lithium carbonate, in which no effect is contributed by the addition of epoxy compound, rather exhibits an effect lower than that of the sole use of lithium carbonate. This proves that the epoxy compound, only by combined with Zn soap, can contribute to improve uptaking ability.

Embodiments 16, 17 and 18 also prove the effect of the combination discussed above, and especially Zn soap is excellent as metallic soap. The combination, composed of lithium carbonate and Zn soap together with either polyol or beta-diketone, also improve the effect as seen in Embodiments 19 and 20. The comparison between Embodiments 21, 22 and 23 represents the effect of the combination of lithium carbonate and lithium salt of fatty acid, in which the increased amount of the lithium salt improves the effect, and the further addition of Zn soap provides a further improved result.

As discussed above, the HCl uptaking ability is increased by fine granulation of lithium carbonate when combined with a metallic soap such as Zn soap. Such a combination can be further combined with one or more of phosphorous esters, beta-diketones, polyols, carboxylic acids, and lithium carboxylate, thus the effect of uptaking HCl is further improved.

A calcium compound is hydrolyzed at high temperature and its HCl uptaking ability is lowered. In contrast, lithium carbonate exhibits a higher uptaking rate as shown in the all Embodiments, and it is found that lithium carbonate is superior to calcium compounds as the means for HCl uptaking.

As discussed above, the present invention provides an improved chlorine-containing resin composition which produces extremely small amount of HCl, even when the wall or floor materials thereof are flamed by fire disasters, or the waste thereof is burned.

TABLE 1

Ingredients of chlorine-containing resin composition in Embodiments and Comparative examples.
Unit (phr): added value by weight relative to 100 weight parts of polyvinyl chloride resin.

| Composition Embodiment | Embodiment | | | | Comparative | | |
|---|---|---|---|---|---|---|---|
| | 1 | 2 | 3 | 4 | 1 | 2 | 3 |
| Polyvinyl chloride (Z121) | | 100 | | | | 100 | |
| Lithium hydroxide (anhydride) (LiOH) | 40 | | | 40 | | | |
| Lithium hydroxide (LiOH.H2O) | | 70 | | | | | |
| Lithium carbonate (Li2CO2) 9.6 μm | | | 60 | | | | |
| Colloidal calcium carbonate 0.08 μm | | | | 10 | 100 | | |
| Heavy calcium carbonate, 5.0 μm | | | | | | 100 | |
| Stabilizer (of Sn family) | | 2.4 | | | | 2.4 | |
| Plasticizer (DOP) | | 60 | | | 100 | 60 | |
| Viscosity adjuster (Glycerin fatty acid ester) | | 3.5 | | | | 3.5 | |
| Diluent (Paraffin family hydrocarbon) | | 20 | | | | 20 | |

Theoretical addition amount of the reaction compound with HCl relative to 100 weight parts of polyvinyl chloride:
lithium hydroxide (anhydride): 38 phr.
lithium carbonate: 60 phr.
lithium hydroxide (monohydrate): 67 phr.
calcium carbonate: 81 phr.

TABLE 2

Measurement of HCl produced at combustion and uptaking rate.

| | Combustion temperature | HCl producing amount [mg/g] | HCl uptaking rate [%] |
|---|---|---|---|
| Embodiment 1 | 500 | 11.3 | 96.0 |
| | 600 | 20 | 93.0 |
| | 700 | 14 | 95.1 |
| Embodiment 2 | 600 | 13.9 | 95.0 |
| | 750 | 12.4 | 94.4 |
| | 800 | 2.2 | 99.1 |
| Embodiment 3 | 500 | 142.2 | 45.0 |
| | 750 | 106.0 | 59.0 |
| Embodiment 4 | 750 | 7.6 | 97.2 |
| Comparative example 1 | 500 | 19.7 | 89.7 |
| | 600 | 18.3 | 90.4 |
| | 750 | 37.2 | 80.5 |
| | 800 | 78.5 | 58.9 |
| Comparative example 2 | 500 | 128.7 | 41.4 |
| | 800 | 143.2 | 34.8 |
| Comparative example 3 | 500 | 499 | — |
| | 800 | 571 | — |

Comparative Example 3 shows, in the case of polyvinyl chloride alone in combustion, the HCl is almost completely produced at 800 degree C., since the produced HCl amount is very close to the theoretical producing value of 584 mg/g.

TABLE 3

Ingredients of chlorine-containing resin composition in each of Embodiments (Unit (phr): added value by weight relative to 100 weight parts of polyvinyl chloride resin).

| Embodiment Composition | 1 | 2 | 3 | 4 | 5 | 6 | 7 | 8 | 9 | 10 | 11 | 12 | 13 |
|---|---|---|---|---|---|---|---|---|---|---|---|---|---|
| Polyvinyl chloride | 100 | 100 | 100 | 100 | 100 | 100 | 100 | 100 | 100 | 100 | 100 | 100 | 100 |
| DOP | 60 | 60 | 60 | 60 | 60 | 60 | 60 | 60 | 60 | 60 | 60 | 60 | 60 |
| Lithium carbonate | | | | | | | | | | | | | |
| Average particle size 9 μm | 60 | | | | | | | | | | | | |
| 6 μm | | 60 | | | | | | | | | | | |
| 32 μm | | | 60 | | 90 | 120 | 60 | | | | | | |
| 1.4 μm | | | | 60 | | | | | | | | 60 | |
| B24 (*1) | | | | | | | | | | | | | |
| B144 (*2) | | | | | | | | 60 | 60 | 60 | | | |
| B240 (*3) | | | | | | | | | | | 60 | | 60 |
| Stabilizer | 2 | 2 | 2 | 2 | 2 | 2 | | | | | | | |
| Disperser | 3.5 | 3.5 | 3.5 | 3.5 | 3.5 | 3.5 | 3.5 | 3.5 | 3.5 | 3.5 | 3.5 | 3.5 | 3.5 |
| Epoxy resin | | | | | | | | | | | | | |
| Epoxidized soybean oil | | | | | | | | | | 2 | 1 | | |
| Phosphorous ester | | | | | | | | | | 1 | 0.5 | | 0.5 |
| Zn stearate | | | | | | | | 10 | | | | | |
| Zn octiate | | | | | | | | | 5.6 | | 6.5 | 5 | 6.5 |
| Cd stearate | | | | | | | | | | | | | |
| Pb stearate | | | | | | | | | | | | | |
| Li stearate | | | | | | | | | | | | | |
| Penta erythritol | | | | | | | | | | | | | |
| Beta-diketone (*4) | | | | | | | | | | | | | |

*1: Ground by ball mill for 24 hrs.
*2: Ground by ball mill for 144 hrs.
*3: Ground by ball mill for 240 hrs.
*4: Dibenzoyl methane.

TABLE 14

Ingredients of chlorine-containing resin composition in each of Embodiments (Unit (phr): added value by weight relative to 100 weight parts of polyvinyl chloride resin).

| Embodiment Composition | 14 | 15 | 16 | 17 | 18 | 19 | 20 | 21 | 22 | 23 | 24 | 25 |
|---|---|---|---|---|---|---|---|---|---|---|---|---|
| Polyvinyl chloride | 100 | 100 | 100 | 100 | 100 | 100 | 100 | 100 | 100 | 100 | 100 | 100 |
| DOP | 60 | 60 | 60 | 60 | 60 | 60 | 60 | 60 | 60 | 60 | 60 | 60 |
| lithium carbonate | | | | | | | | | | | | |
| Average particle size 9 μm | | | | | | | | | | | | |
| 6 μm | | | | | | | | | | | | |
| 32 μm | | | | | | | | | | | | |
| 1.4 μm | 60 | 60 | | | | | | | | | | |
| B24 (*1) | | | | | | | | 60 | 60 | 60 | | |
| B144 (*2) | | | | | | | | | | | | |
| B240 (*3) | | | 60 | 60 | 60 | 60 | 60 | | | | 60 | 60 |
| Stabilizer | | 2 | | | | | | | | | | |
| Disperser | 3.5 | 3.5 | 3.5 | 3.5 | 3.5 | 3.5 | 3.5 | 3.5 | 3.5 | 3.5 | 3.5 | 3.5 |
| Epoxy resin | | | | 3 | 3 | | | | | | | 1 |
| Epoxidized soybean oil | 3 | 3 | 2 | | | | | | | | | 0.5 |
| Phosphorous ester | | | 1 | 1.5 | 1.5 | | | | | | | |
| Zn stearate | | | | | | | 10 | | | 5 | | |
| Zn octiate | 5.6 | | 5 | | | 6.5 | 6.5 | | 5.6 | | 6.5 | 1 |
| Cd stearate | | | | 10 | | | | | | | | |
| Pb stearate | | | | | 10 | | | | | | | |
| Li stearate | | | | | | | | | 0.5 | 3 | 1.7 | 1.65 |
| Penta erisritol | | | | | | 2 | | | | | | |
| Beta-diketone (*4) | | | | | | | 1 | | | | | |

*1: Ground by ball mill for 24 hrs.
*2: Ground by ball mill for 144 hrs.
*3: Ground by ball mill for 240 hrs.
*4: Dibenzoyl methane.

TABLE 5

Measurement of HCl produced at combustion and uptaking rate.

| No. of Embodiments | HCl producing amount [mg/g] | HCl uptaking rate [%] |
| --- | --- | --- |
| Embodiment 1 | 106.2 | 59.0 |
| Embodiment 2 | 119.9 | 53.7 |
| Embodiment 3 | 83.9 | 67.6 |
| Embodiment 4 | 23.0 | 91.1 |
| Embodiment 5 | 43.0 | 81.2 |
| Embodiment 6 | 14.3 | 92.7 |
| Embodiment 7 | 50.5 | 79.8 |
| Embodiment 8 | 21.2 | 91.9 |
| Embodiment 9 | 19.1 | 92.5 |
| Embodiment 10 | 13.9 | 94.5 |
| Embodiment 11 | 8.1 | 96.8 |
| Embodiment 12 | 18.1 | 92.9 |
| Embodiment 13 | 17.0 | 93.3 |
| Embodiment 14 | 18.1 | 92.8 |
| Embodiment 15 | 34.8 | 86.4 |
| Embodiment 16 | 12.1 | 95.2 |
| Embodiment 17 | 18.6 | 92.4 |
| Embodiment 18 | 19.9 | 91.9 |
| Embodiment 19 | 12.1 | 95.2 |
| Embodiment 20 | 17.9 | 92.9 |
| Embodiment 21 | 43.4 | 83.4 |
| Embodiment 22 | 38.3 | 85.3 |
| Embodiment 23 | 29.1 | 88.7 |
| Embodiment 24 | 15.1 | 94.0 |
| Embodiment 25 | 14.6 | 94.3 |

What is claimed is:

1. A chlorine-containing resin composition, said composition comprising:

a chlorine-containing resin;

a first hydrogen chloride uptaking agent dispersed in from 40 to 70 parts by weight per 100 parts by weight of said resin, said uptaking agent comprising a compound selected from the group consisting of lithium hydroxide, lithium hydroxide monohydrate, and lithium carbonate wherein said first uptaking agent reduces the production of hydrogen chloride upon combustion of said resin composition; and a second hydrogen chloride uptaking dispersed in from 0 to 10 parts by weight per 100 parts by weight of said resin, said uptaking agent comprising calcium carbonate.

2. The chlorine-containing resin composition of claim 1 further comprising at least one metallic soap selected from the group consisting of metallic soaps of the Zn, Cd and Pb.

3. The chlorine-containing resin composition of claim 1 further comprising at least one compound selected from the group consisting of epoxy compounds, phosphorous esters, beta-diketones, polyols, carboxylic acids, and lithium salts of carboxylic acids.

4. The chlorine-containing resin composition of claim 1 wherein the particle size is less than 10 microns.

* * * * *

UNITED STATES PATENT AND TRADEMARK OFFICE
CERTIFICATE OF CORRECTION

PATENT NO. : 5,932,644

DATED : August 3, 1999

INVENTOR(S) : Kiyotoshi Fujii

It is certified that error appears in the above-identified patent and that said Letters Patent is hereby corrected as shown below:

Add following new claim:

5. A resin molded product formed from the chlorine-containing resin composition of claim 1.

Column 16, line 20, delete "the" (second occurrence).

Signed and Sealed this

Seventh Day of March, 2000

Attest:

Attesting Officer

Q. TODD DICKINSON

Commissioner of Patents and Trademarks